US005608327A

United States Patent [19]
Jones et al.

[11] Patent Number: 5,608,327
[45] Date of Patent: Mar. 4, 1997

[54] METHODS AND APPARATUS FOR IDENTIFYING FAULTED PHASES ON AN ELECTRIC POWER TRANSMISSION LINE

[75] Inventors: Martin S. Jones, Stafford; David W. P. Thomas, Nottingham, both of United Kingdom

[73] Assignee: Gec Alsthom Limited, United Kingdom

[21] Appl. No.: 417,912

[22] Filed: Apr. 6, 1995

[30] Foreign Application Priority Data

Apr. 25, 1994 [GB] United Kingdom .................. 9408138

[51] Int. Cl.⁶ .......................................... G04R 31/08
[52] U.S. Cl. ...................... 324/522; 361/68; 364/483
[58] Field of Search ................................. 324/522, 534, 324/539; 361/66, 77, 68; 364/483

[56] References Cited

U.S. PATENT DOCUMENTS

| | | | |
|---|---|---|---|
| 4,183,072 | 1/1980 | Takagi et al. | 361/68 |
| 4,390,835 | 6/1983 | Elkateb | 324/539 |
| 4,398,255 | 8/1983 | Premarlani . | |
| 4,438,475 | 3/1984 | Haley . | |
| 4,731,688 | 3/1988 | Nimmersjo et al. . | |
| 4,731,689 | 3/1988 | Nimmersjo et al. . | |
| 4,855,861 | 8/1989 | Bergman et al. | 324/522 |
| 4,864,453 | 9/1989 | Bergman et al. | 324/522 |
| 4,906,937 | 3/1990 | Wikstrom et al. | 324/522 |
| 5,072,403 | 12/1991 | Johns | 324/522 |
| 5,390,067 | 2/1995 | Eriksson et al. | 324/86 |
| 5,399,974 | 3/1995 | Eriksson et al. | 324/522 |
| 5,446,387 | 8/1995 | Eriksson et al. | 324/522 |

FOREIGN PATENT DOCUMENTS

| | | |
|---|---|---|
| 0325786 | 8/1989 | European Pat. Off. . |
| 0325786A1 | 8/1989 | European Pat. Off. . |
| 2911844 | 10/1979 | Germany . |
| 2070869 | 9/1981 | United Kingdom . |

OTHER PUBLICATIONS

*Scheme, based on traveling–waves, for the protection of major transmission lines*, Christos Christopoulos, et al., IEE Proceedings, vol. 135, Pt. C. No. 1, Jan., 1988, pp. 62–73.

*Primary Examiner*—Maura K. Regan
*Attorney, Agent, or Firm*—Kirschstein, et al.

[57] ABSTRACT

The invention provides method and apparatus for identifying the faulted phases on the occurrence of a single phase fault simultaneously on both circuits of a double circuit electric power transmission line using measurements taken at one end only of the line. Using measurements of voltage and current at the one end of the line and a knowledge of various parameters of the line, a signal representative of the travelling wave arriving at the one end of the line in consequence of the faults is derived. This derived signal is used to deduce the values of the components of the derived signal attributable to the different faults for each of a number of assumptions as to which phases are faulted. The deduced values for the different assumptions are then used to determine which assumption is most likely to be correct.

9 Claims, 3 Drawing Sheets

Fig.4.

| FAULT CURRENTS | | | PROPOSED SELECTION FUNCTIONS | | | | | | POLES TO TRIP | | | | | |
|---|---|---|---|---|---|---|---|---|---|---|---|---|---|---|
| a | b | c | α | β | γ | δ | ε | ζ | a | b | c | a' | b' | c' |
| 1 | 1 | 1 | X | X | X | X | X | X | R | R | R | R | R | R |
| 1 | 0 | 0 | X | X | X | X | X | X | R | R | R | R | R | R |
| 0 | 1 | 0 | X | X | X | X | X | X | R | R | R | R | R | R |
| 0 | 0 | 1 | X | X | X | X | X | X | R | R | R | R | R | R |
| 1 | 1 | 0 | 1 | 0 | X | X | X | X | 1 | 0 | 0 | 0 | 1 | 0 |
| 1 | 1 | 0 | 0 | 1 | X | X | X | X | 0 | 1 | 0 | 1 | 0 | 0 |
| 1 | 1 | 0 | 0 | 0 | X | X | X | X | R | R | R | R | R | R |
| 1 | 1 | 0 | 1 | 1 | X | X | X | X | R | R | R | R | R | R |
| 0 | 1 | 1 | X | X | 1 | 0 | X | X | 0 | 1 | 0 | 0 | 0 | 1 |
| 0 | 1 | 1 | X | X | 0 | 1 | X | X | 0 | 0 | 1 | 0 | 1 | 0 |
| 0 | 1 | 1 | X | X | 0 | 0 | X | X | R | R | R | R | R | R |
| 0 | 1 | 1 | X | X | 1 | 1 | X | X | R | R | R | R | R | R |
| 1 | 0 | 1 | X | X | X | X | 1 | 0 | 1 | 0 | 0 | 0 | 0 | 1 |
| 1 | 0 | 1 | X | X | X | X | 0 | 1 | 0 | 0 | 1 | 1 | 0 | 0 |
| 1 | 0 | 1 | X | X | X | X | 0 | 0 | R | R | R | R | R | R |
| 1 | 0 | 1 | X | X | X | X | 1 | 1 | R | R | R | R | R | R |

METHODS AND APPARATUS FOR IDENTIFYING FAULTED PHASES ON AN ELECTRIC POWER TRANSMISSION LINE

BACKGROUND OF THE INVENTION

This invention relates to methods and apparatus for identifying faulted phases on an electric power transmission line.

According to statistics, most faults which occur on a high voltage electric power transmission line last for a fraction of a second only, and 93% of faults which occur are single phase to ground faults. A common practice on major high voltage transmission lines is therefore to use single pole reclosing, that is, when a fault exists on a single phase only which can be identified, that single phase is disconnected and reconnection attempted after a short delay by which time the fault has often cleared. If reconnection is unsuccessful, i.e. the fault is still present when reconnection is attempted, the reclosure sequence may be repeated, e.g. two or three times. By using this practice disturbance to an electric power supply system of which the transmission line forms part is reduced and hence the reliability of the system is improved.

It is at present possible to identify with reasonable certainty the faulted phase when single phase fault occurs on a single circuit transmission line. It is also possible to identify the faulted phase when a single phase fault occurs on one of the two circuits of a double circuit transmission line. A scheme is described in EP-A-0325786 which is intended to identify the faulted phases when single phase faults occur simultaneously on both circuits of a double circuit transmission line, but this scheme requires measurement of quantities at both ends of the transmission line, and hence requires communication between the fault identifying apparatus and both ends of the line.

SUMMARY OF THE INVENTION

It is an object of the present invention to provide a method and apparatus for identifying simultaneous single phase faults on a double circuit transmission line from measurements taken at one end only of the line.

According to the present invention there is provided a method for identifying faulted phases on the occurrence of single phase faults simultaneously on both circuits of a double circuit electric power transmission line comprising: deriving for at least one circuit first and second signals respectively representative of the voltage and current at one end of said line; utilizing said first and second signals together with parameters of the line to derive a third signal representative of the travelling wave arriving at said one end of said line in consequence of the occurrence of said faults; utilizing said third signal to deduce the values of the two components of said third signal respectively attributable to said faults for each of a plurality of assumptions regarding the identify of the faulted phases on the two circuits; and utilizing the deduced values for the different assumptions to determine which assumption is most likely to be valid.

In one method according to the invention the determination as to which assumption is most likely to be valid is made on the basis of an inspection of the changes with time of the value of at least one of said components for different said assumptions, i.e. an inspection of the shapes of the waveform of said at least one component for different said assumptions.

In a second method the determination is made on the basis of a comparison of the relative values of said two components for different said assumptions.

In another method according to the invention first, second and third signals are derived for both circuits and values of said two components are deduced utilizing both said third signals. In such a method the determination as to which assumption is most likely to be valid is suitably made on the basis of comparison of values obtained using the third signal for one circuit with values obtained using the third signal for the other circuit.

The invention also provides apparatus for carrying out a method according to the invention.

BRIEF DESCRIPTION OF THE DRAWINGS

The invention will now be further explained and methods and apparatus in accordance with the invention described by way of example with reference to the accompanying drawings in which:

FIG. 4 is a table illustrating one particular method in accordance with the invention.

DETAILED DESCRIPTION OF THE PREFERRED EMBODIMENTS

When a fault occurs on a transmission line the disturbance created by the fault at the fault point can be considered as travelling waves propagating away from the fault point.

Figure 1:
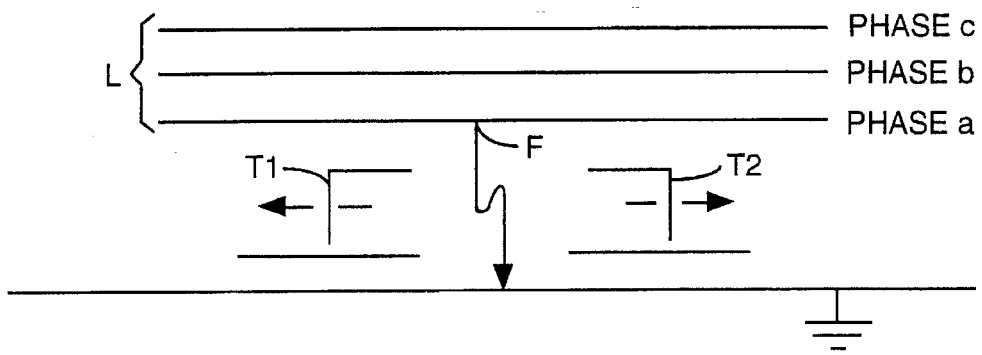
FIG. 1 is a diagram illustrating the travelling waves initiated by a fault on a transmission line.

Referring to FIG. 1, which illustrates a single phase to ground fault at a point F on phase-a of a transmission line L, at first two equal amplitude travelling waves, indicated at T1 and T2, propagate away from the fault point F in opposite directions along the line L. The value of the voltage (V1) of these waves T1 and T2 is given by the matrix equation $$[Vl]=[kvf][Vf] \qquad (1)$$

where [kvf] is the fault reflection matrix; and

[Vf] is the pre-fault voltage at the fault point F.

Equation (1) is, of course, more fully written as:

$$\begin{bmatrix} V1\,(\text{phase }a) \\ V1\,(\text{phase }b) \\ V1\,(\text{phase }c) \end{bmatrix} = \begin{bmatrix} k_{11} & k_{12} & k_{13} \\ k_{21} & k_{22} & k_{23} \\ k_{31} & k_{32} & k_{33} \end{bmatrix} \begin{bmatrix} Vf\,(\text{phase }a) \\ Vf\,(\text{phase }b) \\ Vf\,(\text{phase }c) \end{bmatrix} \qquad (2)$$

Both equations (1) and (2) may be written using modal or phase quantities.

It will be appreciated that the fault reflection matrix [kvf] is dependent on the nature of the fault i.e. the fault type, that is, which phase or phases is/are faulted and the fault impedances.

Figure 2:
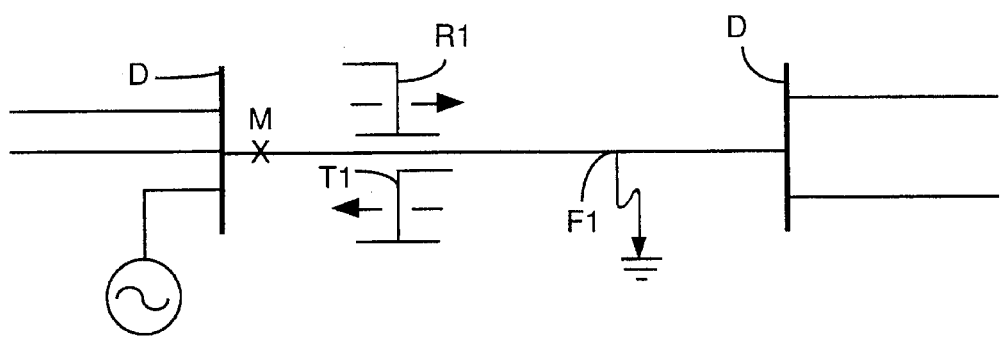
FIG. 2 is a diagram illustrating the fault initiated travelling waves incident at a monitoring point in a single circuit transmission line.

Referring now to FIG. 2, one of the two waves T1 and T2 (wave T1 in FIG. 2) is incident at a monitoring point M at one end of the line L shortly after the occurrence of the fault. In addition, where, as is normally the case, the monitoring point M is close to a discontinuity D, such as a connection of the end of the line L to a busbar, or other part of the supply system of which the line L forms part, a reflected wave R1 is also present at the monitoring point M due to reflection of the wave T1 at the discontinuity D back towards the fault point F.

By monitoring the voltage (V) and current (I) of the travelling wave component of the resultant of the waves T1 and R1 at the monitoring point M the value of the voltage V1 of the wave T1 can be derived using the matrix equation $$[V1] = \frac{[V] - [Zs][I]}{2} \quad (3)$$

where Zs is the surge impedance of the line L.

It will be appreciated that equation (3) is strictly true for only a very short period because, as the fault generated travelling waves propagate further through the system, further reflected waves reach the monitoring point M. However, these further waves have a much reduced value so that equation (3) normally gives a good estimate of V1 at the monitoring point M for at least the first 10 milliseconds after the first appearance of fault generated travelling wave T1 at the monitoring point M.

Having thus obtained a value for V1, it is then possible to deduce the correct value of kvf, and hence the fault type, using equation (1) and an estimate of the fault voltage Vf.

This method of identifying fault type in an electric power transmission line is described for example, in an article entitled "Scheme based on travelling-waves for the protection of major transmission lines" by Christopolous C, Thomas D.W.P. and Wright A. appearing on pages 63 to 73 of Proc. I.E.E. Volume 135 Part C (1988). However, the method is not successful for a double circuit transmission line, since simultaneous faults on each circuit greatly distort the waveforms of the resulting travelling waves. When simultaneous faults occur on both circuits of a double circuit line, known fault type identification routines will correctly deduce the faulted phases, and that both circuits are faulted, but the actual phase faulted in each circuit cannot be identified. For instance, if a phase-a to ground fault occurs on one circuit and a phase-b to ground fault occurs simultaneously on the other circuit, all that can be deduced is that phases a and b are faulted on both circuits. This will normally result in a three-phase trip on both circuits. If the faulted phases could be properly identified a single-phase trip would be effected on each circuit minimising the interruption of the supply.

The manner in which the method of the invention enables such improved identification of fault type which will now be explained.

Figure 3:
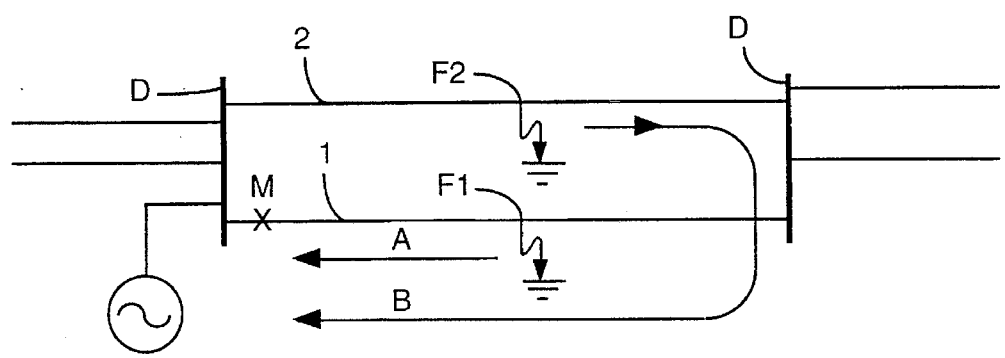
FIG. 3 is a diagram illustrating the fault initiated travelling waves incident at a monitoring point in a double circuit transmission line.

Referring now to FIG. 3, if a transmission line has two circuits 1 and 2 and faults occur simultaneously on both circuits, the travelling wave due to the faults arriving at a monitoring point M on circuit 1 has two components, one attributable to the fault F 1 on circuit 1 and the other to the fault F2 on circuit 2. The component due to the fault F 1 on circuit 1 has a value given by equation (1) above. The component due to the fault F2 on circuit 2 comprises the wave generated at the fault F2, of a value given by equation (1), after reflection at the discontinuity D at the end of the line L remote from the monitoring point M and propagation through the fault F1 on the circuit 1.

As with the single circuit line, the travelling wave at the monitoring point M is dominated by these two components, subsequent secondary reflection components being of much reduced value. Hence the value V1 of the travelling wave arriving at the monitoring point M on the circuit of the line L of FIG. 3 is given by the matrix equation:

$$[V1]=[kvf(1)][Vf(1)]+[[u]+[kvf(1)]][\Gamma_D][kvf(2)][vf(2)] \quad (4)$$

where [kvf(1)] is the fault reflection matrix of the circuit 1 fault [kvf(2)] is the fault reflection matrix of the circuit 2 fault [Vf(1)] is the pre-fault voltage at the circuit 1 fault point [Vf(2)] is the pre-fault voltage at the circuit 2 fault point [ΓD] is the discontinuity D reflection matrix; and [u] is a unit matrix As does equation (1) for the single circuit case, equation (4) represents three simultaneous equations in phase or modal quantities. For the purposes of fault identification according to the invention the information from ground, i.e. common, mode may be ignored. The two simultaneous equations then represented by equation (4) can be used to deduce a value A for the voltage of the wave propagating from the fault F1 on circuit 1 to the monitoring point M and a value B for the voltage of the wave propagating from the fault F2 on circuit 2 which is reflected at discontinuity D and propagates through the fault on circuit 1, where $$A=kvf(1)\cdot Vf(1) \quad (5)$$

$$B=kvf(2)\cdot Vf(2) \quad (6)$$

To simplify this calculation it may be assumed that the discontinuity reflection matrix [ΓD] is a unit matrix and all fault resistances are zero. The calculation, of course, required derivation of V1 from measurements of the voltage and current of the resultant travelling wave appearing at the monitoring point M, as described above in relation to equation (3).

To identify fault type the calculation of A and B is carried out for all the possible values of kvf(1) and kvf(2), i.e. for all the possible combinations of a single phase fault on each of the two circuits 1 and 2. It will be appreciated in this connection that such calculations are only carried out after it has been determined that a fault exists and the phases which are faulted are known. Hence, the number of possible fault combinations is limited.

In one particular fault identification method according to the invention values obtained for A and B for each assumed fault combination using measurements of voltage V and current I taken at a monitoring point M1 on circuit 1 and a corresponding monitoring point M2 on circuit 2 are compared to see which of them is greater for the various fault combinations. From the results of these comparisons the true fault combination is deduced. Disconnection of the faulted single phase of each circuit is then effected accordingly, and subsequent reclosure effected, the disconnection and reclosure sequence being repeated, if necessary, as desired.

It will be appreciated that a decision regarding disconnection and reclosure is normally effected on a majority basis only after a deduction of the faulted phases has been made in respect of each of a series of measurements of the voltage V and current l.

A truth table for the deduction of fault type from measurements taken at the two monitoring points is shown in FIG. 4, where P1 is the wave propagating directly from the fault F1 on the circuit 1 to the monitoring point M1 on circuit 1 (i.e. equivalent to wave A of equation (5)) where kvf(1) and kvf(2) assume respectively a phase-a to ground fault on circuit 1 and a phase-b to ground fault on circuit 2;

P2 is the wave propagating directly from the fault F1 on the circuit 1 to the monitoring point M2 on circuit 2 (i.e. equivalent to wave B of equation (6)) where kvf(1) and (kvf(2)) assume respectively the same ground faults as for P1;

Q1 and Q2 are as for P1 and P2 respectively except that kvf(1) and kvf(2) assume respectively a phase-b to ground fault on circuit 1 and a phase-a to ground fault on circuit 2;

R1 and R2 are as for P1 and P2 respectively except that kvf(1) and kvf(2) assume respectively a phase-b to ground fault on circuit 1 and a phase-c to ground fault on circuit 2;

S1 and S2 are as for P1 and P2 respectively except that kvf(1) and kvf(2) assume respectively a phase-c to ground fault on circuit 1 and a phase-b to ground fault on circuit 2;

T1 and T2 are as for P1 and P2 respectively except that kvf(1) and kvf(2) assume respectively a phase-a to ground fault on circuit 1 and a phase-c fault to ground on circuit 2; and W1 and W2 are as for P1 and P2 respectively except that kvf(1) and kvf(2) assume respectively a phase-c to ground fault on circuit 1 and a phase-a to ground fault on circuit 2.

Also in FIG. 4 the select functions $\alpha = P1 > P2 \quad \beta = Q1 > Q2 \quad \gamma = R1 > R2$
$\delta = S1 > S2 \quad \Sigma = T1 > T2 \quad \zeta = W1 > W2$ and
1 indicates a condition is satisfied;

O indicates a condition is not satisfied; and

X indicates it does not matter whether a condition is, or is not satisfied.

It will be seen from row 5 in FIG. 4 that when significant fault current is present on phase-a and phase-b but not on phase-c, if P1>P2 but Q1≧Q2, it is deduced that single phase to ground faults have occurred on phase-a of circuit 1 and phase-b of circuit 2.

Similar deductions regarding fault identity are illustrated in rows 6, 9, 10, 13 and 14.

In rows 7, 8, 11, 12, 15 and 16 two phase faults which cannot be deduced as comprising a single phase fault on each circuit are shown. Tripping in accordance with the normally followed strategy is then effected e.g. tripping on all three phases, as indicated by R.

For completeness FIG. 4 also illustrates the cases where fault current is present on all three phases or one phase only when the normal tripping strategy is again followed whatever are the values of $\alpha$, $\beta$ etc.

It will be appreciated that the method described above with reference to FIG. 4 requires communication between the two monitoring points M1 and M2. However, since values for both wave A and wave B can be obtained using measurements made at one only of monitoring points M1 and M2, the above described method can be modified for use with a monitoring point on one only of the two circuits 1 and 2 of line L.

In an alternative method in accordance with the invention which uses measurement made on one circuit only, a time series of values of A for each possible fault combination is obtained. From the time series for each fault combination the waveform of the travelling wave voltage generated by the fault on circuit 1 can be deduced. The fault combination which gives the waveform of greatest amplitude is then taken to be the true fault combination.

Figure 5:
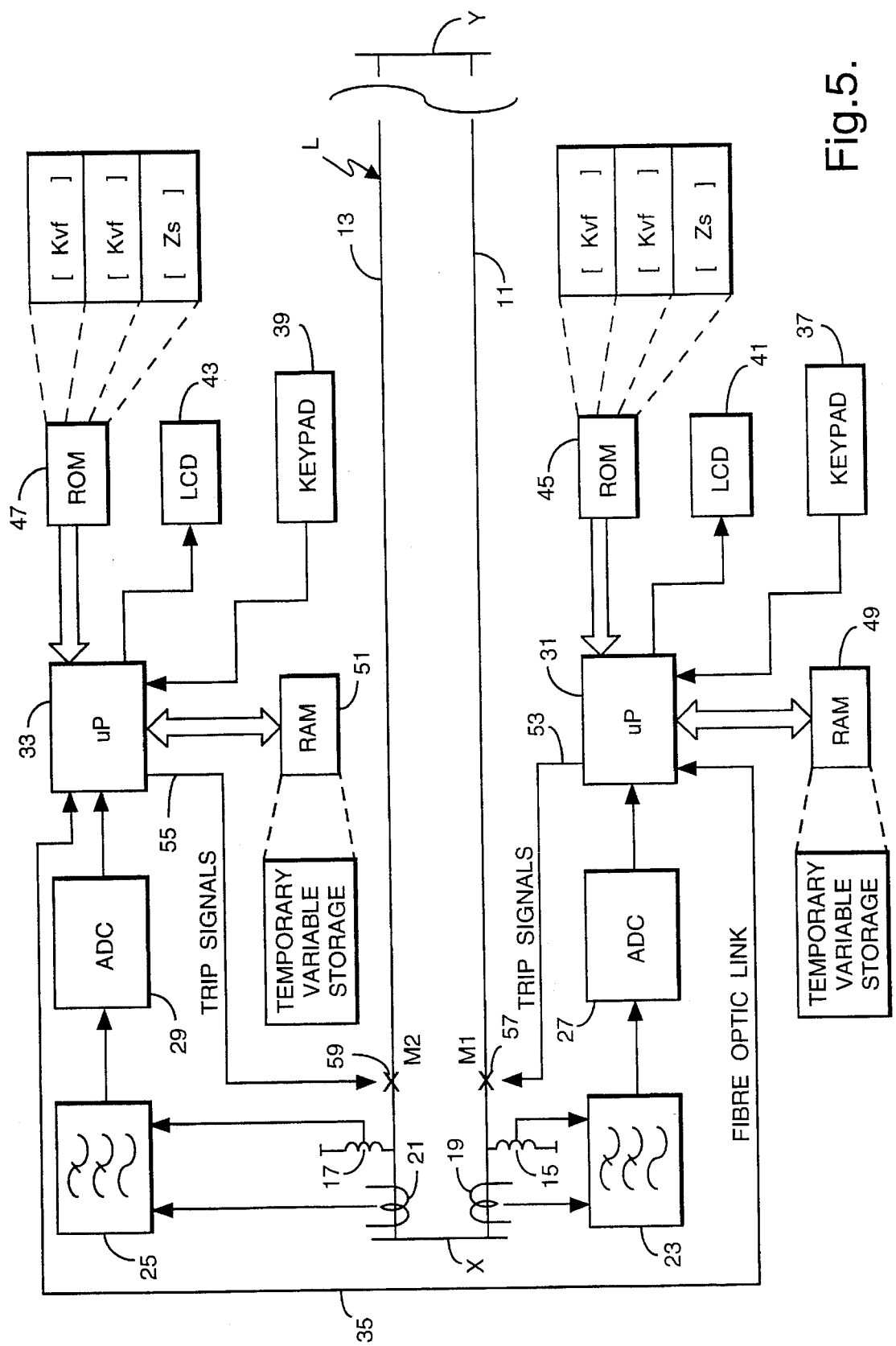
FIG. 5 is a schematic diagram of the apparatus to be described by way of example.

One apparatus for carrying out a method according to the invention will now be described, by way of example, with reference to FIG. 5.

The apparatus is intended for use in identification of the faulted phases when single phase faults occur simultaneously on both circuits 11 and 13 of a double circuit three-phase transmission line L which is shown as interconnecting two busbars X and Y.

The apparatus comprises measuring equipment at each of two monitoring points M1 and M2 respectively situated at a position near the end of the line connected to busbar X.

Each measuring equipment comprises a voltage sensor 15 or 17 and a current sensor 19 or 21, for measuring the voltages and currents at the monitoring points M1 and M2, low pass filters 23 or 25 which extract power frequency information from the outputs of the sensors 15 and 19 or 17 and 21, an analogue to digital converter 27 or 29 for converting the analogue signals output by the filters 23 or 25 into a series of digital signals representing successive samples of the analogue signals, and a microprocessor, 31 or 33, which receives these digital signals.

Each of the microprocessors 31 and 33 is associated with a keypad 37 or 39 for data and instruction entry, a display 41 or 43, a read only memory (ROM) 45 or 47 in which the line parameters required for carrying out fault identification, e.g. reflection matrices and line surge impedance matrices, are stored, a random access memory (RAM) 49 or 51 which provides temporary variable storage for use by the microprocessors 31 or 33 in operation, and an output port 53 or 55 via which trip signals are passed from the microprocessor 31 or 33 to circuit breaker equipment 57 and 59 on the circuits 11 and 13.

The microprocessors 31 and 33 are interconnected via a fibre optic communication link 35 so that the calculations made in them can be compared and decisions regarding fault type made accordingly.

In operation of the apparatus the voltage and current sensors 15, 17, 19 and 21 measure the actual phase voltages and currents on the circuits 11 and 13 at the monitoring points. These voltages and currents are, of course, the resultants of steady state and travelling wave voltages and currents at the monitoring points. As a first step, therefore, the digital signals passed to the microprocessors 31 and 33 are utilised to isolate the travelling wave voltages and currents from the voltages and currents measured by sensors 15, 17, 19 and 21. This is suitably done in conventional manner by storing, on a continuing basis, signals relating to the immediately preceding cycle of the power system, and substracting from each measured value the stored value obtained for the same point-on-wave of the preceding power system cycle. When no travelling wave is present the resultant of this subtraction will, of course, be zero, but will otherwise be representative of the magnitude of the resultant of any travelling wave components present at the instant of time at which the later of the two subtracted digital signals was obtained. The values so obtained, which are of course values of V and l of equation (3) above, are then used in the microprocessors 31 and 33, as described above in relation to equation (4), to derive values for A and B as defined above in equations (5) and (6), and hence to deduce the identity of the fault in accordance with a method according to the invention.

It will be appreciated that normally a time series of set values of V and l are taken over a period of 10 milliseconds, i.e. a half cycle at a power frequency of 50 Hz. Typically thirty-six sets of values are obtained. Each set of values is then used separately to identify the faulted phases and the final tripping decision made on a majority vote basis as regards fault identity.

We claim:

1. A method for identifying faulted phases on the occurrence of single phase faults simultaneously on both circuits of a double circuit electric power transmission line comprising the steps of: deriving for at least one circuit first and second signals respectively representative of the voltage and current at one end of said line; utilizing said first and second signals together with parameters of the line to derive a third signal representative of the traveling wave arriving at said one end of said line in consequence of the occurrence of said faults; utilizing said third signal to deduce the values of the two components of said third signal respectively attributable to said faults for each of a plurality of assumptions regarding the identity of the faulted phases on the two circuits; and utilizing the deduced values for the different assumptions to determine which assumption is most likely to be valid.

2. A method according to claim 1 wherein the determination as to which assumption is most likely to be valid is made on the basis of a comparison of the relative values of said two components for different said assumptions.

3. A method according to claim 1 wherein the determination as to which assumption is most likely to be valid is made on the basis of changes with time of the value of at least one of said two components for different said assumptions.

4. A method according to claim 3 wherein the assumption most likely to be valid is taken to be the assumption which leads to the largest amplitude variation of said at least one component.

5. A method according to claim 1 wherein said first, second and third signals are derived for both said circuits; and deducing the values of said two components using both said third signals.

6. A method according to claim 5 wherein the determination as to which assumption is most likely to be valid is made on the basis of comparison of values obtained using the third signal of one circuit with values obtained using the third signal for the other circuit.

7. An apparatus for identifying faulted phases on the occurrence of single phase faults simultaneously on both circuits of a double circuit electric power transmission line comprising: first means for deriving first and second signals respectively representative of the value of the voltage and current at one end of at least one circuit of said line; and means for calculating from the values of said first and second signals together with parameters of the line a third signal representative of the value of the travelling wave arriving at said one end of said line in consequence of the occurrence of said faults, for calculating the values of the two components of said third signal respectively attributable to said faults for each of a plurality of assumptions regarding the identity of the faulted phases on the line and for utilizing the deduced values for the different assumptions to determine which assumption is most likely to be valid.

8. An apparatus according to claim 7 comprising two said first means and two said calculating and utilizing means one for each circuit of the line, and a communication link between said means for calculating and utilizing.

9. An apparatus according to claim 7 wherein said first means provides digital output signals and said means for calculating and utilizing comprises microprocessor means.

* * * * *